United States Patent [19]
Edri

[11] Patent Number: 5,520,045
[45] Date of Patent: May 28, 1996

[54] TIRE DEFLATION WARNING SYSTEM

[75] Inventor: Rafael Edri, Eilat, Israel

[73] Assignee: Good Wheel Ltd., Israel

[21] Appl. No.: 235,788

[22] Filed: Apr. 29, 1994

[51] Int. Cl.[6] .................................................. B60C 23/00
[52] U.S. Cl. ............................ 73/146; 340/443; 340/445
[58] Field of Search ........................... 73/146, 146.2, 73/862.381; 340/442, 443, 445

[56] References Cited

U.S. PATENT DOCUMENTS

| | | | |
|---|---|---|---|
| 2,091,101 | 8/1937 | Moss | 340/443 |
| 2,834,844 | 5/1958 | Zastrow | 200/61.23 |
| 2,990,536 | 6/1961 | Pace | 340/443 |
| 3,413,598 | 11/1968 | Uphoff | 340/443 |
| 3,610,851 | 10/1971 | Krupski | 200/61.24 |
| 3,984,808 | 10/1976 | Laz et al. | 340/443 |
| 4,075,602 | 2/1978 | Clothier | 340/443 |
| 4,814,744 | 3/1989 | Collins | 73/146.2 |
| 4,970,491 | 11/1990 | Saint et al. | 340/447 |
| 5,001,457 | 3/1991 | Wang | 340/447 |
| 5,032,822 | 7/1991 | Sweet | 340/443 |
| 5,109,213 | 4/1992 | Williams | 340/447 |
| 5,327,116 | 7/1994 | Davidson | 340/443 |

FOREIGN PATENT DOCUMENTS

| | | |
|---|---|---|
| 2318748 | 8/1977 | France . |
| 13723 | 3/1960 | Israel . |

*Primary Examiner*—Richard Chilcot
*Assistant Examiner*—George M. Dombroske
*Attorney, Agent, or Firm*—Wigman, Cohen, Leitner & Myers

[57] ABSTRACT

Apparatus for the detection of vehicular tire deflation is disclosed. The apparatus generally comprises a post member adapted to be mounted at its proximal and to a vehicle's undercarriage so that its distal end can engage a road surface when the distance between the vehicle and the road surface decreases due to deflation of the tire.

13 Claims, 6 Drawing Sheets

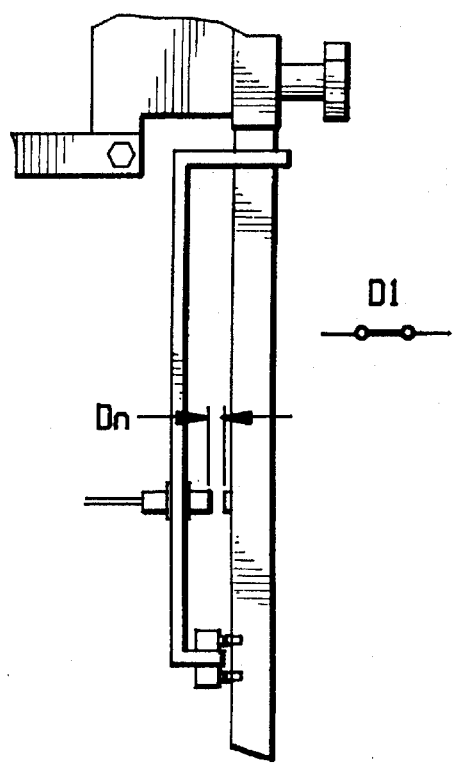
FIG.4a
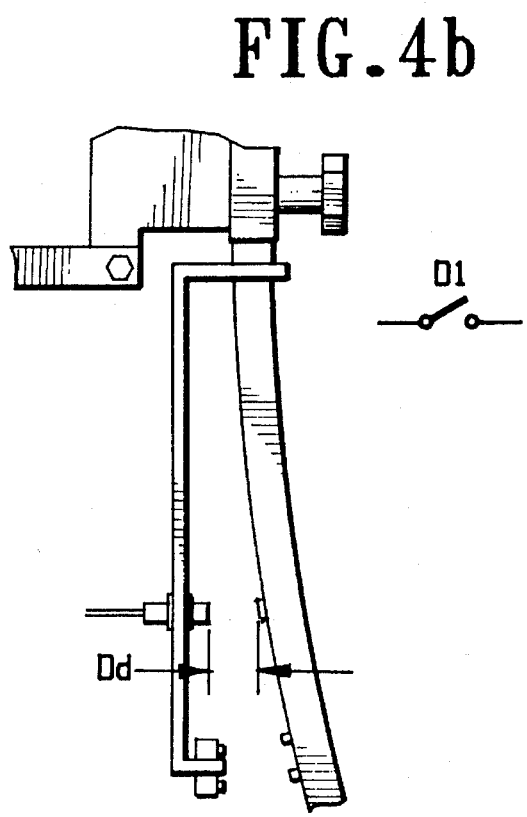
FIG.4b
FIG.5
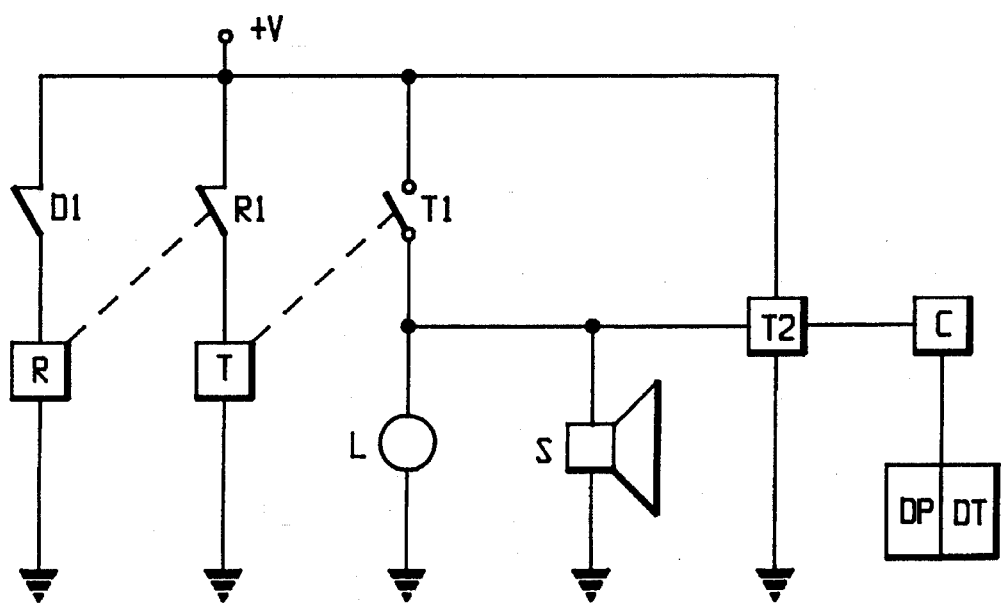

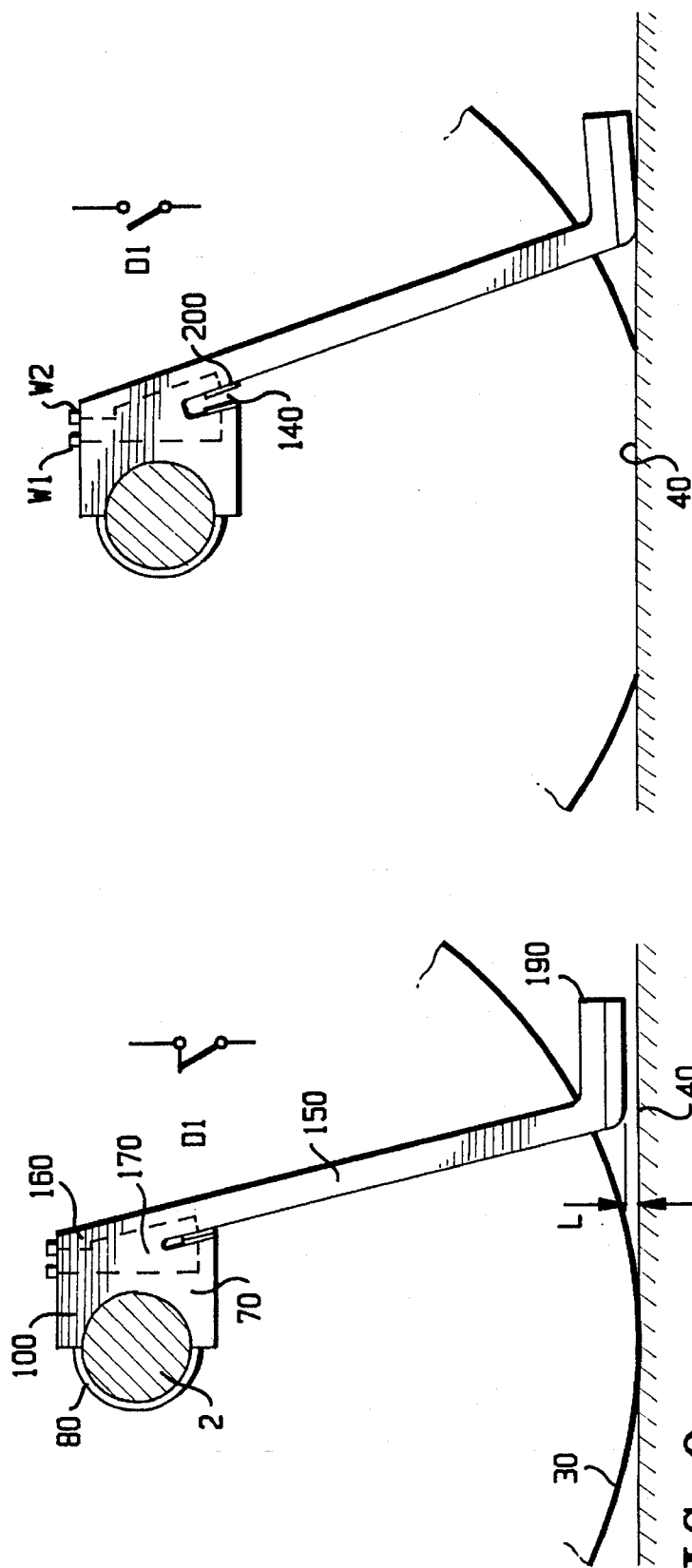

TIRE DEFLATION WARNING SYSTEM

FIELD OF THE INVENTION

The present invention relates to transporting, in particular to vehicle warning devices, and can be used in motor vehicles provided with pneumatically inflated tires.

More particularly the invention relates to systems for detection, monitoring and alerting of reduction in the air pressure in the road-engaging tires of a vehicle which is riding along the roadway.

BACKGROUND OF THE INVENTION

In most cases early detection of slow leaks and development of the deflated condition in the tire of a moving vehicle to a large extent depends on the personal ability of the driver to feel minor changes in the vehicle riding qualities resulting from a loss of pressure in the tire.

The driver is usually aware of deflation only after the pressure in the tire is already lost to such an extent that changes in the vehicle riding qualities are accompanied by difficulties in vehicle control, which might even cause a safety hazard.

There are also other undesirable consequences of the deflated condition of a tire, e.g., excessive flexing and heating of the tire followed by its rapid wear and often irreparable damage.

This situation becomes especially critical in the case of heavy trucks with multiple tires, or truck tractors with articulated vehicles liked towed trailers or platforms, in that there are many specific factors relating to such vehicles which make working conditions particularly unfavorable for early detection of minor changes in vehicle behaviour, i.e., at the very beginning of deflation.

Among the factors which prevent the driver's timely detection of deflation development should be mentioned: increased level of noise and vibrations during riding, distance disposition of the truck tractor and the towed vehicle, excessive loads on the front axle caused by the front drive assembly absorbing changes in vehicle behaviour before they are felt by the driver, etc.

There are numerous known systems which have been designed to solve the above problem and which are intended to warn the driver about the low pressure condition in pneumatic tires of a travelling vehicle.

These systems can generally be divided into two types:

1) those including a sensing means directly mounted on the rotating tire and able to detect changes in the tire caused by deflation, e.g., generation of excessive heat or deficient pressure in the tire. An appropriate signal, generated by a sensing means informs the driver of these changes.

2) those including a feeler member which touches the ground when the distance between the vehicle and the road surface is reduced due to the deflated condition of the tire, and then activates an appropriate signal-producing means which warns the driver.

A description of the systems relating to the first type can be found, for example, in Saint's U.S. Pat. No. 4,970,491 and in Wang's U.S. Pat. No. 5,001,457.

The system disclosed in Saint includes a transmitter, coupled with the valve stem of each vehicle tire, which senses a respective low pressure condition of the tire, and which transmits an appropriate signal, accordingly activating an alerting means.

The system described in Wang consists of a plurality of pressure gauges, each respectively attached to pneumatic tires and each pressure gauge transmitting a signal to the appropriate alarm circuit when a certain tire is deflated below a predetermined nominal pressure.

There are some inherent disadvantages related to this type of warning systems, in general, and with those disclosed in the above patents, in particular. Among these disadvantages one can mention insufficient reliability associated with the possibility of the sensing means affixed to the rotating tire to be damaged due to centrifugal forces acting upon it. Another disadvantage which can be referred to this type of warning system is the inconvenience in maintenance due to the necessity of dismantling the sensing means from the deflated tire and remounting it on a new one each time replacement of a deflated tire takes place.

The present invention relates to the second type of warning system referred to above, which is based on utilization of a feeler member and its contact with the ground to generate an alarm signal. Descriptions of such a system can be found in Clothier's U.S. Pat. No. 4,075,602 and Sweet's U.S. Pat. No. 5,032,822.

The low tire alarm system disclosed in Clothier's patent includes a feeling member extended in a downward position and mounted on a shaft in the vicinity of each tire, and pivot movement of said member is possible with respect to the shaft.

The feeler member is normally situated above ground level when the associated vehicle tire is in a normally inflated condition. However, when there is a low pressure condition in one or more of the ground-engaging tires, contact is made between the feeler member and the ground surface. The feeler member is forced by the forward moving vehicle to pivot about the shaft, and this causes the electrical circuit to light the lamp which warns the driver that a low pressure condition exists in one of the vehicle tires.

The tire deflation warning system specified in Sweet's patent utilizes a device which is attached to the wheel axle of a vehicle, adjacent to each pneumatically inflated tire at a fixed distance from the underlying road surface. This device employs a vertically disposed post-like feeler member, its lower extremity adapted to contact the road surface when the distance between the road surface and wheel axle is reduced due to tire deflation. When the post touches the road surface, it is forced upward, thus causing contact to be made with an electrical switch, which in turn activates a signal-producing means in the driver's cabin.

One of the disadvantages associated with the systems referred to above is that the feeler member employed in them is made rigid, in order to ensure proper activation of the signal-producing means when this feeler member touches the road surface.

Since this rigid feeler member is mounted under the wheel axle and extends relatively far downward toward the ground, there is a danger that it might easily be damaged by obstacles which protrude above the ground, and which are high enough to collide with its lower extremity.

Collision might happen even before deflation starts and the feeler member touches the ground. A similar situation might happen when the vehicle returns from the low road side to the main road.

Another disadvantage of known warning systems lies in the fact that in these systems the distance between the lower extremity of the feeler member and the road surface depends not only on the tire condition, but is also influenced by the loading condition of the undercarriage. This factor is especially pronounced in heavy trucks, truck tractors, towed trailers and platforms, in which said distance might be reduced by 3,5–7 centimeters in loaded condition, as compared to not loaded condition.

The above consideration requires reservation of additional space between the feeler member and the road surface in order to ensure that they will not touch when the vehicle is loaded, and there is still no tire deflation. An inevitable consequence of this requirement is the possibility that deflation in the tire will be detected only after significant loss of pressure.

Still another disadvantage associated with known lower pressure warning systems relates to the fact that they only alert with regard to deflation but are not able to predict tire behaviour after deflation is detected.

In conclusion, it should be emphasized that despite the fact that the above problem of deflation detection in vehicle tires has been known since the very beginning of the introduction of pneumatically inflated tires, it is still a vital one and there is still a need for a new, reliable, convenient and economical system, which will ensure the early detection of deflation, its monitoring and timely warning to the driver when this condition might become hazardous.

SUMMARY OF THE INVENTION

The object of the present invention is to provide a system for detection, monitoring and warning of loss of pressure in the tire of a moving vehicle, in which the above-mentioned drawbacks are sufficiently reduced or overcome.

In particular, the first object of the present invention is to provide a simple, reliable and economical system for early detection of tire pressure loss, while this system is not connected to the tire itself and can be mounted on the wheel axle adjacent to the road without being limited to the space between the axle and the road surface.

The second object of the present invention is to provide a system in which the danger of its damage due to collision of the feeler member with obstacles protruding above the road surface is reduced.

The third object of the present innovation is to provide a system in which timely detection of tire deflation is ensured in its earliest stage, irrespective of the loading condition of the vehicle.

Still another object of the present invention is to provide a new system which ensures early detection of tire deflation, monitoring of current tire condition, and warning to the driver of possible tire behaviour.

The above and other objects and advantages of the present invention can be achieved in accordance with the following combination of its essential features:

a system for detection, monitoring and warning of reduction in the air pressure in a wheel tire of a traveling vehicle, provided with at least one pneumatically inflated tire, when said tire engages the road surface, consisting of:

a means for mounting of said system on the axle of the wheel, preferably adjacent to the undercarriage of a vehicle at a certain distance between the axle and the road surface corresponding to the normally inflated condition of the tire, associated with said means and downwardly extending from it, a post adapted to contact the road surface by its lower extremity when said distance is reduced, for example, due to deflation of the tire, sensing means, interacting with said post and adapted to detect when said post contacts the road surface switching means, controllable by said sensing means, and signal producing means adapted to be activated upon on or off condition of said switching means and to inform the driver about deflation in the tire, characterized in that at least part of said post is made resiliently bendable as to be able to bow in any direction when it contacts the road surface while being dragged by the moving vehicle, when said distance is sufficiently reduced and to return to its initial configuration after said distance is, at least partially, restored; said sensing means is adapted to detect a condition when the post is dragged; the system comprises a timing means, counting time interval between each consequent off- and on-condition of said switching means, which corresponds respectively to dragged/non-dragged condition of the post and said timing means is adapted to activate said signal producing means, when said time interval exceeds preset value.

According to one of the preferred embodiments, said switching means is of the normally closed type electric on/off switch.

In accordance with another preferred embodiment substantially for use in heavy trucks or trailing vehicles, said means for mounting and fixing of said system comprises a height compensation unit which interacts with the undercarriage of the vehicle, and adapts to keep a predetermined distance between the lower extremity of said post and the road surface, irrespective of the load condition of the undercarriage.

In accordance with still another embodiment, said height compensation unit is formed as a pantograph, and said post is mounted on one of the levers of said pantograph, while the opposite lever of said pantograph is adapted to contact the undercarriage of the vehicle.

In a further preferred embodiment, said height compensation unit is formed as two-toothed bars meshing with a pinion and said post is adapted to contact said first toothed bar, while said second toothed bar is adapted to contact said undercarriage.

Furthermore, in another preferred embodiment substantially for use in non-heavy vehicles, said mounting means comprises a body portion embracing said wheel axle, and a neck portion formed integrally with the upper extremity of said post; a recess is provided between the post and the neck portion so as to ensure pivot movement of said post with respect to the neck portion while opening said recess, when the lower extremity of said post contacts the road surface and is dragged by the moving vehicle and said sensing means is located in said recess with possibility to detect its opening.

The present invention, in its various embodiments, has only been summarized briefly.

For better understanding of the present invention as well as of its advantages, reference will now be made to the following description of its embodiments, combined with accompanying drawings.

BRIEF DESCRIPTION OF THE DRAWINGS

FIG. 4a,b present an enlarged fragment of FIG. 3a,b showing the disposition of the feeler member with regard to the switching means in the tire's normal inflated and partially deflated conditions, correspondingly.

FIG. 5 is an electrical diagram, which shows electrical connections between switching means, timing means and signal producing means, employed in the warning system according to the present invention.

FIGS. 9a,b,c present a fragmentary schematic view of an alternative embodiment of the present invention, preferably for use in a light-weight vehicles.

DETAILED DESCRIPTION OF THE SPECIFIC EMBODIMENTS

Figure 1:
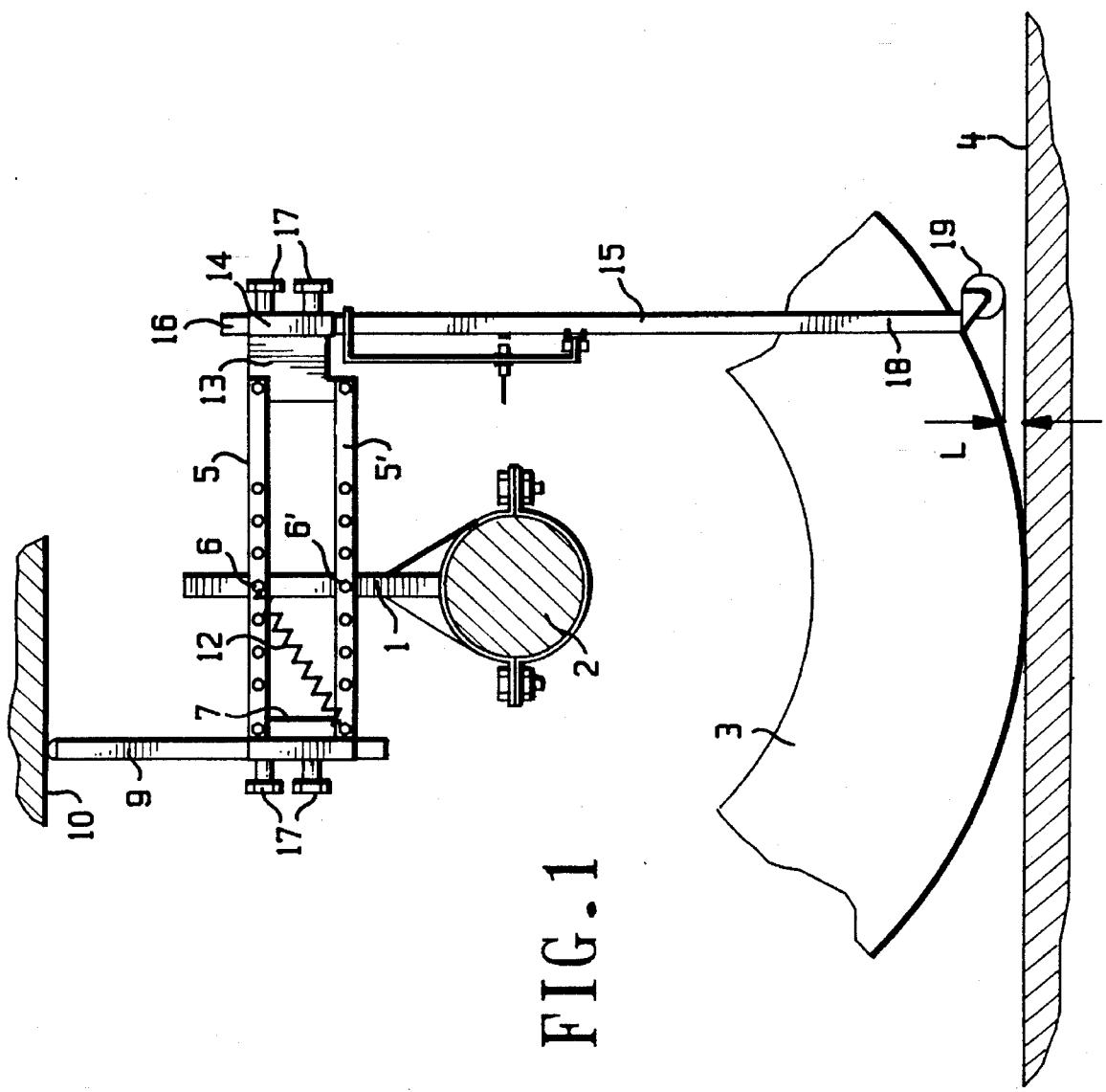
FIG. 1 shows a schematic view of the present invention when it is mounted on an axle of the vehicle.

Referring to FIG. 1 the warning system, according to the present invention, includes a mounting means formed as a fixture 1, provided with a clamp, embracing an axle housing 2 of the wheel (not shown) as to be rigidly fixed on it. The system is mounted along the axle, preferably in the vicinity of the vehicle wheel, engaging the road surface 4, when the vehicle is travelling.

A further description refers to the warning system arranged for use with one tire; however, it should be understood that for detection and warning of deflation in the remaining tires, similar systems can be installed to operate independently.

According to the embodiment shown in FIG. 1 and preferably intended for use in heavy vehicles, the system is provided with a height compensation unit, formed as a pantograph, the lever arms 5,5' of which are installed with possibility for movement about axes 6,6' with respect to fixture 1.

The significance and principle of operation of the height compensation unit will be explained in detail later on.

Lever arm 7 of the pantograph is provided with a retention collar 8, which carries spacer rod 9, which extends towards the undercarriage 10 of the vehicle. The degree of extension of the rod 9 from the collar 8 can be adjusted and fixed by a pair of set screws 11, so as to ensure contact with the undercarriage. An additional means for ensuring contact between the space rod and the undercarriage can also be provided; for example, spring 12, connecting axes 6 with lever arm 7 thus urging rod 9 to move towards the undercarriage.

Lever arm 13 of the pantograph is located opposite lever arm 7 and carries a retention bushing 14 for mounting of the feeler member. This feeler member is formed as an elongated post 15, the upper extremity 16 of which is installed inside the bushing 14, allowing for longitudinal movement and then rigid fixation in the bushing 14 by a pair of set screws 17. The post 15 extends from the bushing 14 downward toward the ground and is provided at its distal extremity 18 with a contact member 19. The upper extremity 16 of the post is mounted in the bushing in such a manner that in the normally inflated condition of the tire 3, a certain distance L is provided between its distal extremity and the road surface. Once there is deflation in the tire 3 the axle housing 2 sinks downward, together with a fixture 1 and the pantograph, carrying the post, until the contact member 19 touches the ground.

One of the embodiments of said contact member is presented in FIG. 1, where this member is shown as a wheel rotatively contacting the road surface and adapted to rotate about the longitudinal axes of the post.

Alternative embodiments of the contact member 19 are also possible, for example, as a spherical tip, shoe or pad made of a wear-resistant material and attached to the distal extremity of the post. The post is made at least partially resiliently bendable so as to ensure that at least in its downward extending from the bushing portion, it is able to bow in any direction, when its distal extremity touches the road surface and is dragged due to the movement of the vehicle. Resiliency of the post ensures that this portion becomes straight again when the distance L between the contact member and the road surface is at least partly restored.

Figure 3A:
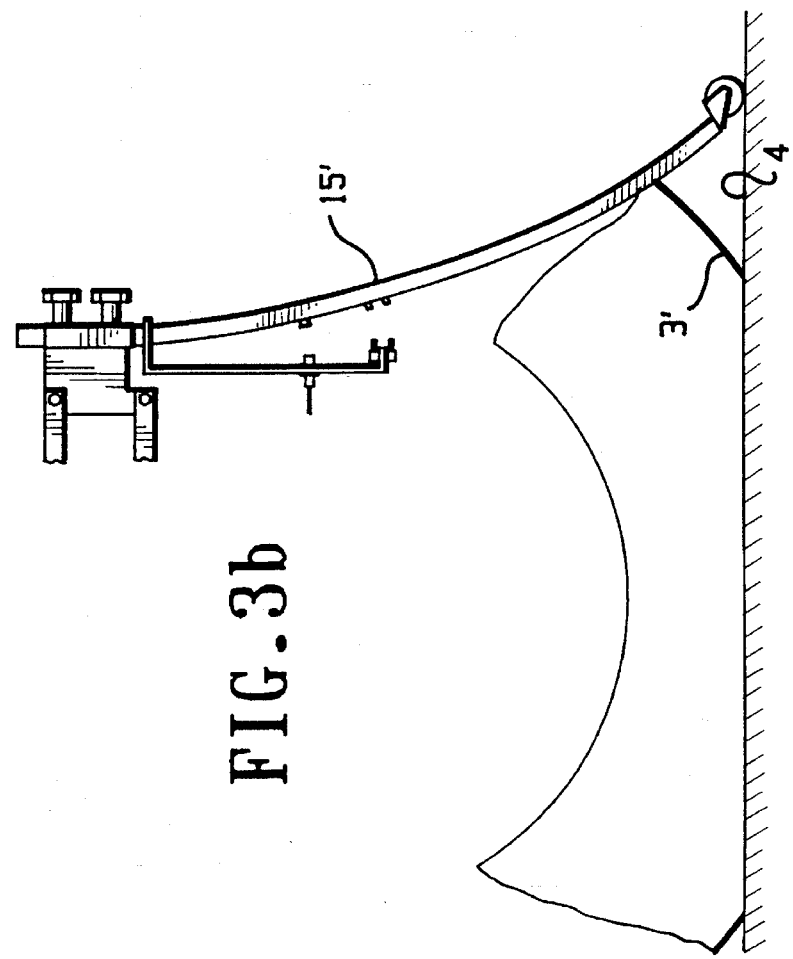
FIG. 3a,b show the position of the feeler member employed in the present invention substantially for use in heavy vehicles, corresponding to the tire's normal inflated and partially deflated conditions, respectively.
Figure 3B:
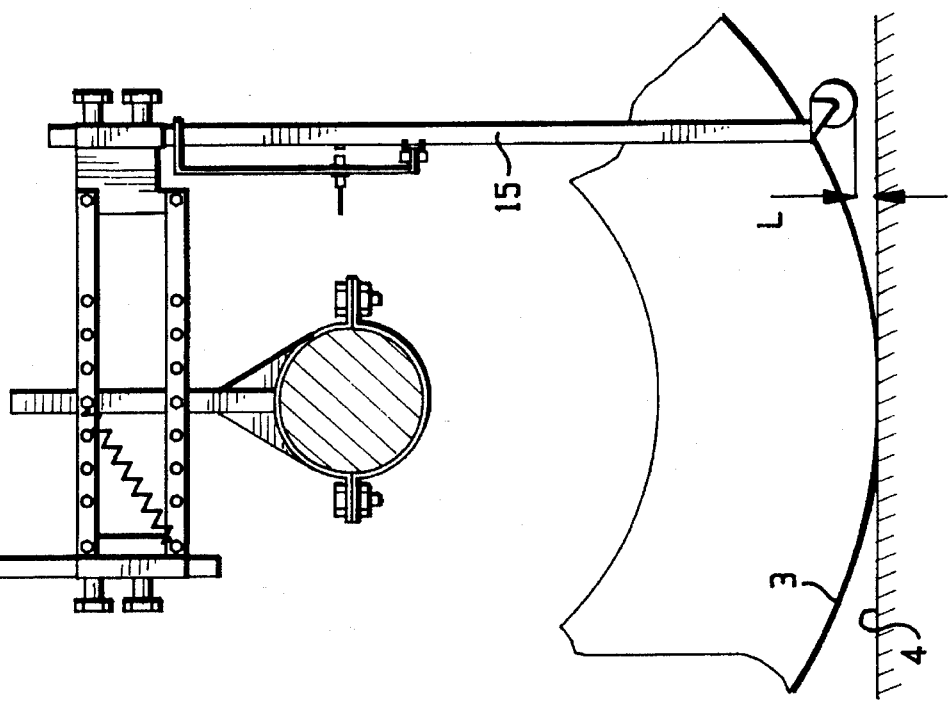

As can be seen on FIG. 3b the bent configuration of the post 15' referred to above corresponds to the deflated condition in the tire 3', while the normally inflated condition of the tire 3 and straight configuration of the downward extending portion of the post are shown in FIG. 3a.

In order to ensure resilient bending, the post can be formed as a thin wall tube made of metallic material, or it can be formed as a solid rod made of appropriate plastic material with appropriate elastic properties.

The distance L can be adjusted by loosening screws 17, moving the upper extremity 16 of the post along the bushing 14, and then retightening screws 17.

Figure 2:
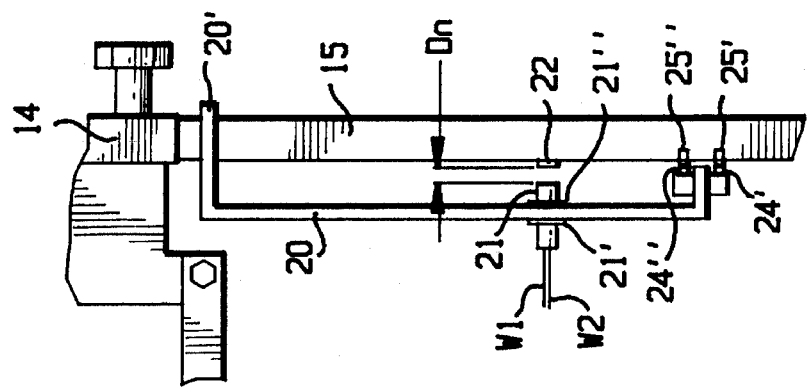
FIG. 2 is an enlarged fragment of the detail circled in FIG. 1.

Reference will now be made to FIGS. 2 and 4, in which it is shown that an T-shaped bracket 20 is attached by its upper section 20' to the post.

The bracket extends along the post and carries a sensing means 21, mounted on it with the aid of screwed washers 21', 21". Disc 22 is mounted on the post in opposite relation to the sensing means 21, so as to provide for initial distance Dn corresponding to the straight configuration of the post. Once the post bows with respect to its upper extremity 16, fixed in the bushing 14, distance Dn changes to Dd, as shown on FIG. 4b. Sensing means 21 is adapted to detect this change and to generate the appropriate signal in the wiring, W1, W2, connecting sensing means with switching means D1 of electrical schematics shown in FIG. 5. The wiring preferably includes a pair of wire conductors W1, W2, but can also include only one wire conductor and the vehicle body as a second conductor.

Sensing means 21 can be of any appropriate type, suitable for the above purpose, for example, magnetic, inductive or capacitor sensor. Material for disc 22 is to be chosen in accordance with the particular type of sensor employed.

The lower section of bracket 20 is preferably provided with magnets 24', 24", associating with oppositely located metallic bands 25', 25" on the post. Magnets 24'24" are adapted to attract metallic bands 25', 25" and thus to retain the post in its initial disposition at a distance Do from sensing means 21, when the extending portion of the post is straight. By virtue of magnets 24', 25" and metallic bands 25', 25", retention of the post in this position is ensured despite the inevitable shocks and vibrations during vehicle travel.

Now reference will be made to FIG. 5 which shows the electrical schematic with the several switching means and alarms employed in the present invention. This schematic is preferably mounted on the instruments board in the driver's compartment and preferably includes a main on/off switch D1, auxiliary switches R1 and T1, relay R, resetable timing means T and signal producing means, including audible and visible arms, S and L.

The schematic is wired with a source of energy, for example, vehicle battery (not shown) supplying operating voltage V to its components. The main switch D1 is of the normally closed type and is controlled by a signal, generated in sensing means 21.

By virtue of providing the main switch D1 as a normally closed type, it is always ensured that the signal-producing means will be activated and warn the driver in the event of a malfunction in the system, caused, e.g., by accidentally broken wiring, or the like. The alarms can also be outfitted with separate on/off toggle switches, providing for the separate turning on and turning off of each of them.

Besides the above-mentioned signal-producing means which warn the driver of the current deflated condition of the tire, additional means can also be provided, which inform the driver of current pressure in the tire and evaluated time interval remaining since detection of deflated condition in the tire until compulsory replacement of the tire. This means comprises an additional timer T2 connected with alarms, computing means C and displaying means DP and DT for displaying messages advising the driver of current tire pressure and remaining time interval until replacement of the tire.

Figure 6A:
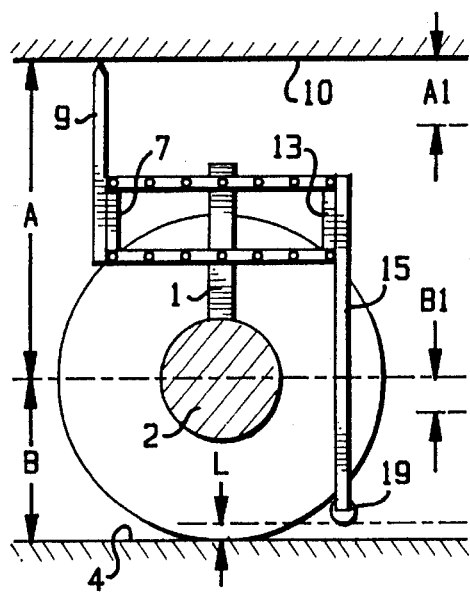
FIGS. 6a,b show the principle of operation of the height compensation unit employed in the present invention.
Figure 6B:
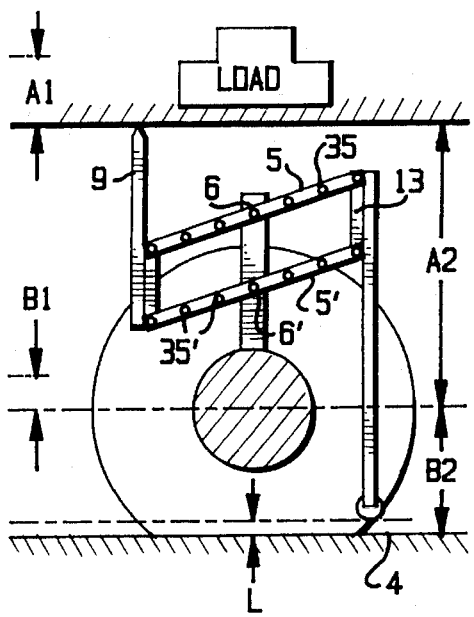

The significance and principle of operation of the height compensation unit will now be explained with reference to FIGS. 6a,b. FIGS. 6a,b correspondingly refer to the normally inflated condition in the tire 3, when the vehicle is not loaded (FIG. 6a) and loaded (FIG. 6b).

The undercarriage 10 of the not loaded vehicle or platform is spaced from the axle housing 2 by a distance A, while the axle housing is spaced from the road surface 4 by a distance B. The axle housing carries a fixture 1 with a pantograph. The arm 7 of the pantograph is provided with a space bar 9, interacting with the undercarriage, while the opposite arm 13 of the pantograph carries post 15, contact member 19 being mounted on its distal extremity.

In normally inflated condition the distance between the contact member and the road surface is L. After the vehicle is loaded, the undercarriage springingly sinks down under the weight of cargo at a distance A1 (see FIG. 6b), and therefore the distance A shortens to A2=A−A1.

The weight of the cargo is transferred via suspension (not shown) to the axle housing 2, compresses the tire, and thus the axle housing goes down together with the fixture, pantograph, and post at a distance B1. As a result of this the distance B shortens to B2=B−B1. Were it not a pantograph, the shortening of distance B would reduce distance L and a situation could arise where the contact member touches the ground when there is still no deflation in the tire.

By virtue of a space rod 9, fixed on the lever arm 7 and interacting with the undercarriage, lowering of the undercarriage at distance A1 causes pivoting of the pantograph lever arms 5,5' about axes 6,6' with respect to fixture 1. This pivoting action results in lifting of the opposite lever arm 13 together with the post mounted on it, and therefore the possibility is provided to compensate for changes in the distance between the post and road surface and to ensure that this distance will always be kept equal to L irrespective of whether the vehicle is loaded or not.

The height at which the post will be lifted and therefore the degree of height compensation, is governed by the lever rule and depends on the location of axes 6,6' with respect to the lever arm. In order to achieve a different degree of compensation, as might be required by a particular type of vehicle, by the weight of its load, by the pressure in the tires and by the condition of its suspension, a series of apertures 35,35' on lever arms 5,5' for axes 6,6', can be provided.

Figure 8:
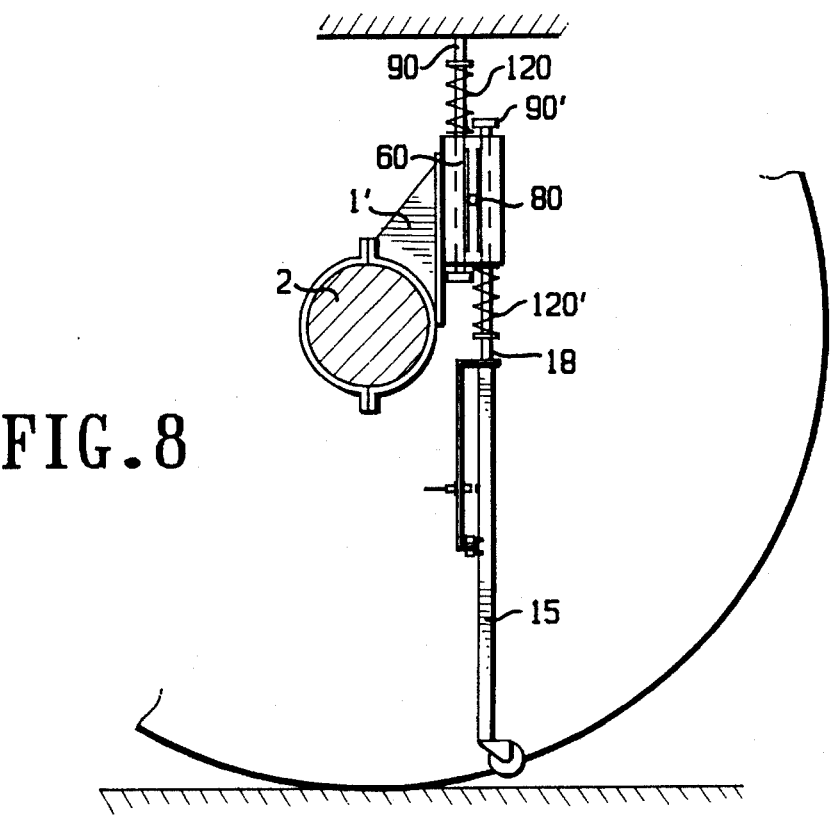
FIG. 8 is a schematic view of one of the alternative embodiments of the height compensation unit employed in the present invention.

An alternative embodiment of the height compensation unit as presented in FIG. 8, can be employed in the system according to the present invention.

The height compensation unit according to this embodiment comprises two bars 90,90', assembled in housing 60, carried by fixture member 1', which is mounted on axle housing 2. As can be seen on FIG. 8 these bars are assembled in such a manner that it is ensured that bar 90 contacts the undercarriage, while bar 90' contacts the post.

Each of these bars is provided with a toothed section, and a pinion 80 is provided, mounted in the same housing 60 between toothed sections of these bars as to ensure their meshing and transfer linear movement of one bar to the other in reversed direction.

In order to ensure reliable contact between bars and undercarriage and the post, respectively, coil springs 120, 120' are provided. Spring 120 urges bar 90 to be lifted up to contact the undercarriage and spring 120' urges bar 90' to be lowered to contact with the upper extremity 16 of the post 15.

The advantage of this embodiment lies in its compact design and therefore possibility for mounting on vehicles, where the axle housing is occupied by other accessories and there is no room for mounting of a pantograph.

As can be seen from the above explanation by virtue of providing a height compensation unit, it is ensured that the distance between the contact member of the post and the road surface is independent of the position of the undercarriage, and therefore, it can be kept minimal as to be influenced solely by small changes in the tire pressure in the early stages of deflation.

At the same time, due to the fact that the post is made resiliently bendable, there is minimized danger of its damage during possible collision with obstacles protruding from the ground.

Figure 7A:
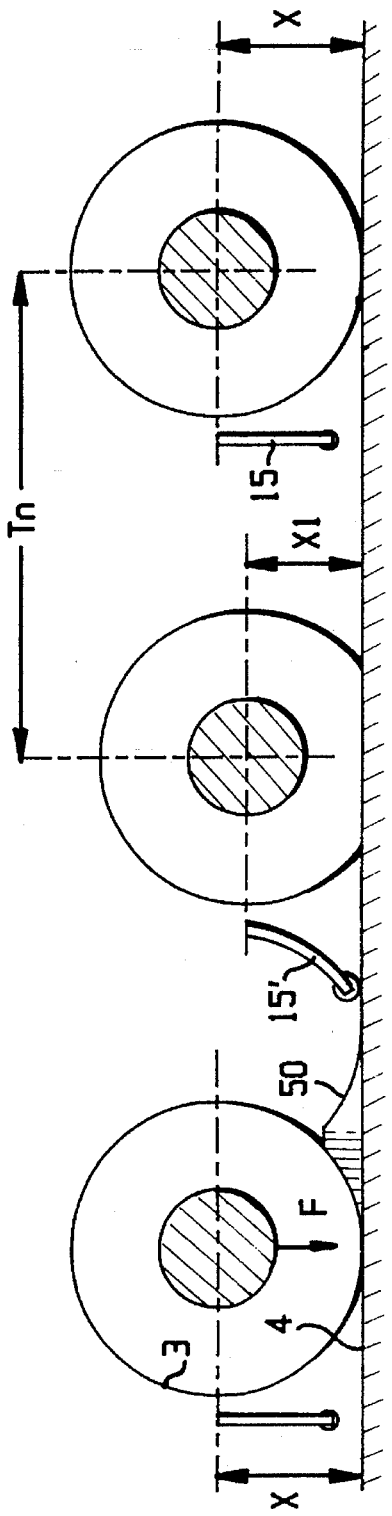
FIGS. 7a,b present operation of the system according to the present invention in the tire's normally inflated and deflated conditions, respectively.

Reference should now be made to FIGS. 7a,b which explain the principle of operation of the warning system according to the present invention.

On FIG. 7a a sequence of events is presented from left to right, showing how a normally inflated tire 3, traveling along the roadway 4, overcomes an obstacle 50, protruding from the road.

When the vehicle is loaded by weight F, the axle housing is in its lowest position at a distance X from the road level; however, the post is adjusted so as to ensure that it does not come into contact with the road surface. The post has a straight configuration, and therefore there is no signal in the sensing means, switching means D1 is closed relay R is inoperative and there is no activation of timing means T and signal producing means L,R.

The wheel, provided with a tire 3 is shown in the left section of FIG. 7a, being in its initial position before meeting obstacle 50 on the roadway. The tire rises up along the obstacle, and then descends, when the obstacle is passed. The potential energy accumulated by the tired depends on the height of the obstacle and weight of the vehicle. This energy, being more than pressure in the tire, causes elastic compression of the tire when it engages the ground again and therefore the resulting distance X1 between the axle and the ground becomes less than before the obstacle. Due to the shortening of this distance the post touches the road surface, and being dragged by the moving vehicle, becomes bent as shown at 15' in the middle section of FIG. 7a. Bending of the post generates the appropriate signal in the sensing means 21, which opens switching means D1, and causes engaging of relay R, which closes switch R1 and activates the timing means T.

Compression of the tire loads to its jumping up and restoring of the distance X between the axle housing and the ground. The period of time needed for restoration of this distance is Tn.

When this distance is restored, the post disengages the ground and returns to its straight configuration, as shown at 15 on the right section of FIG. 7a. Straightening of the post terminates generation of the signal, by sensing means 21, and causes switching of means D1 to its normally closed position while immobilizing the relay, opening contact R1 and thus disactivating the timing means T.

Figure 7B:
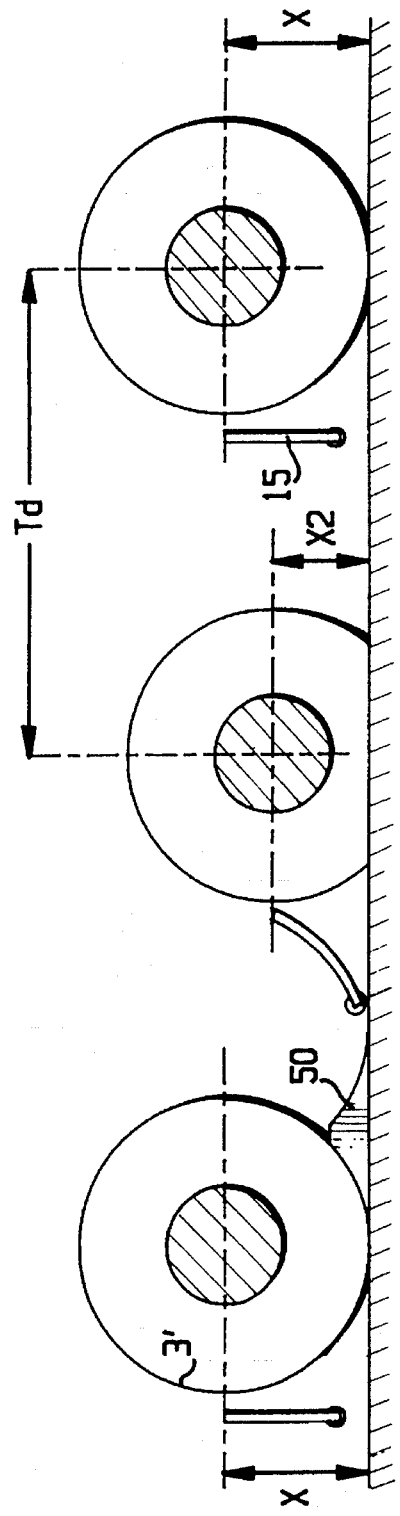

On the left section of FIG. 7b, a deflated tire 3' is shown approaching the same road obstacle 50. The initial distance between the axle housing 2 and the tire is X. After the obstacle is passed, and the tire again engages the road, it becomes compressed more than in the previous case due to reduced pressure in the deflated tire (see middle section of FIG. 7b). Therefore, the distance between the axle housing and road surface reduces to X2>X1.

If deflation in the tire is only in its early stages, the remaining pressure will be sufficient to jump the tire up until the distance X2 is restored to X, and the post again becomes straight, as is shown at 15 on the right section of FIG. 7b. However, it should be understood that the period of time Td until this distance is restored will last longer than Tn. Timing means T can be programmed, and time interval Tn, corresponding to normally inflated condition of the tire, can be preset as to be compared with actual time being counted by timer T. If this actual count time becomes longer than the preset value, timing means T immediately closes contact T1 and signal producing means L and S are activated to warn the driver about the current condition of the tire.

The period of time needed for restoration of said distance from X1 or X2 to X, generally depends on several factors, e.g., pressure in the tire, road conditions, speed of travel, weight of cargo, etc. Nevertheless, it was empirically found that in the warning system according to the present invention, utilizing a resiliently bendable post, the dominant factor determining restoration time is the tire pressure. In particular, it was observed that even reduction of pressure, at approximately 10% from its nominal value, could be detected early because this was accompanied by tripling of restoration time.

Such reduction of pressure usually refers to a very early stage of deflation which is hardly visible; however, performance of the tire is still sufficient for riding and its replacement is not compulsory. Therefore, according to the present invention, there is provided the possibility for timely detection of deflation, which is one of the main advantages of the warning system, compared to known systems, in which the distance between the post and the road surface must be kept much longer and the warning signal be generated only after sufficient deflation has already taken place.

The time interval Tn can be used as a preset value for timing means T and be taken as a reference, corresponding to nominal pressure in the tire. Once deflated condition in the tire is timely detected and reduction of its pressure is in progress, there is a change in the frequency of warning signals, as generated in alarms L,S. This fact can be used for monitoring of current tire behaviour in terms of pressure and prediction of time interval remaining until this pressure is reduced to such a level that driving becomes unsafe.

For this purpose an additional timing means T2, associated with alarms L,S and connected with computing means C, can be used. The computing means C can be programmed to calculate current pressure with reference to nominal pressure, as well as rate of its change in accordance with current frequency of warning signals, and time remaining until it drops to an unacceptable level. This information can be displayed by a pressure displaying means DP and a time displaying means DT, advising the driver when the tire must be replaced.

As can clearly be seen, since deflation has been detected, the possibility of monitoring the current condition of the tire and predicting of its future behaviour, presents an additional advantage of the present system, unachievable in known systems.

With reference to FIGS. 9a, b, c further embodiment of the warning system according to the present invention will be explained.

This embodiment relates preferably to light-weight vehicles, in which the distance between the post and the road surface is much less influenced by the loading condition of the undercarriage and therefore, there a height compensation system might not be needed.

A normally inflated tire 30 of a light-weight car engaging the ground 40 is shown in FIG. 9a. The upper extremity 160 of the resiliently bendable post 150 is formed integrally with the mounting means 100, made of the same material and assembled on the axle housing 2, for example, with the aid of clamp 80. An elongated recess 140 is provided between the post and mounting means, dividing it on the main body portion 70 which is adjacent to the axle housing and a neck portion 170, which is adjacent to the upper extremity 160 of the post.

The post extends downward and is provided at its distal extremity with a bent section 190, which in normally inflated tire condition is separated from the ground by a distance L. When the tire is deflated, section 190 contacts the road surface and the post is dragged by the moving vehicle. By virtue of recess 140 the post resiliently pivots with respect to the neck portion 170 while opening recess 140, as is shown on FIG. 9b,c.

Sensing means 200 is located in said recess so as to detect its opening and generate the appropriate signal in wiring W1, W2 thus controlling condition of normally closed switching means D1.

The rest of the system components, according to this particular embodiment as well as of its functioning, is similar to that described above.

The present invention should not be limited to the above preferred embodiments and it should be understood that changes and modifications can be made by one ordinarily skilled in the art, without deviation of the scope of the invention, as will be defined below in the appended claims.

I claim:

1. Apparatus for detecting vehicular tire deflation comprising:

a post member adapted to be mounted at its proximal end to a vehicle so that its distal end can engage a road surface when the distance between the vehicle and the road surface decreases due to deflation of the tire;

means for sensing movement of said post upon engagement with the road surface and alerting the vehicle driver of deflation of the tire upon actuation of said sensing means; and a pantograph for adjusting the distance between the distal end of said post and the road surface, wherein said post is mounted on one of the levers of said pantograph and the opposite lever of said pantograph is mounted to said vehicle.

2. Apparatus for detecting vehicular tire deflation comprising:

a post member adapted to be mounted at its proximal end to a vehicle so that its distal end can engage a road surface when the distance between the vehicle and the road surface decreases due to deflation of the tire;

means for sensing movement of said post upon engagement with the road surface and alerting the vehicle driver of deflation of the tire upon actuation of said sensing means; and two toothed bars meshing with a pinion for adjusting the distance between the distal end of said post and the road surface said post being mounted to said first toothed bar, said second toothed bar being mounted to said vehicle.

3. Apparatus for detecting vehicular tire deflation comprising:

a post member adapted to be mounted at its proximal end to a vehicle so that its distal end can engage a road surface when the distance between the vehicle and the road surface decreases due to deflation of the tire;

means for sensing movement of said post upon engagement with the road surface, the sensing means including switching means producing a continuous actuation signal actuateable by movement of said post;

alarm means for alerting the vehicle driver of deflation of the tire upon actuation of said sensing means; and timing means for measuring time intervals of each consequent continued actuation signal of said switching means, said timing means being adapted to activate said alarm means upon passage of a predetermined time interval if said actuation signal continues beyond the predetermined time interval.

4. The apparatus of claim 3 wherein said switching means is of normally closed type electric on/off switch.

5. The apparatus of claim 3 further comprising means for adjusting the distance between the distal end of said post and the road surface.

6. The apparatus of claim 5, said distance adjustment means being a pantograph.

7. The apparatus of claim 3, wherein said post is generally resilient.

8. Apparatus for detecting vehicular tire deflation comprising:

a post member adapted to be mounted at its proximal end to a vehicle so that its distal end can engage a road surface when the distance between the vehicle and the road surface decreases due to deflation of the tire;

means for sensing movement of said post upon engagement with the road surface, said sensing means including switching means which provides a continuing DC signal actuateable by movement of said post;

alarm means for alerting the vehicle driver of deflation of the tire upon actuation of said sensing means; and timing means for measuring time intervals of each consequent actuation of said switching means, said timing means being adapted to activate said alarm means upon passage of a predetermined time interval if said actuation signal continues beyond the predetermined time interval.

9. The apparatus of claim 8 wherein said switching means is of normally closed type electric on/off switch.

10. The apparatus of claim 8 further comprising means for adjusting the distance between the distal end of said post and the road surface.

11. The apparatus of claim 10, said distance adjustment means being a pantograph.

12. The apparatus of claim 10, wherein said post is generally resilient.

13. Apparatus for detecting vehicular tire deflation comprising:

a post member adapted to be mounted at its proximal end to a vehicle so that its distal end can engage a road surface when the distance between the vehicle and the road surface decreases due to deflation of the tire;

means for sensing movement of said post upon engagement with the road surface and alerting the vehicle driver of deflation of the tire upon actuation of said sensing means; and self-adjusting means for varying the distance between the distal end of said post and the road surface.

* * * * *